Patented May 13, 1952

2,596,946

UNITED STATES PATENT OFFICE 2,596,946

METHOD FOR PREPARING CRYSTALLINE ANHYDROUS THEOPHYLLINE

George B. Stone, Hempstead, N. Y., assignor to Chas. Pfizer & Co., Inc., New York, N. Y., a corporation of Delaware No Drawing. Application August 12, 1949, Serial No. 110,039

12 Claims. (Cl. 260—256)

My present invention relates to the preparation of an improved form of substantially anhydrous theophylline. More particularly, it concerns a crystalline anhydrous theophylline obtainable by direct crystallization from hot saturated or super-saturated aqueous solutions of theophylline. If desired, the macro-crystals formed may be milled to a smaller particle size.

The present commercial methods for the preparation of anhydrous theophylline involve the dehydration of the monohydrated form of theophylline, represented by the formula

$$C_7H_8N_4O_2 \cdot H_2O$$

This monohydrated form is obtained by crystallization from saturated or super-saturated aqueous solutions of theophylline within the temperature range from 0 to 51.1° C. After separation of the monohydrated crystals from the mother liquor, they are dehydrated at temperatures between 40° C. and 80° C. for periods of time extending up to and at times exceeding 24 hours. In this method of drying it is difficult to control the rate of dehydration, which takes place locally, whereby certain portions become over-dried and discolor yielding a product that is neither uniform, nor of fine quality. Consequently, the present commercial anhydrous theophylline is typified by a frangible, porous granule which easily powders and dusts upon mechanical abrasion during handling or shipping.

More specifically, the dehydration of the hydrated theophylline is subject to the following disadvantages. In the first place, it results, through the driving off of the water of hydration, in porous, opaque granules which are very soft and consist of clusters of minute anhydrous theophylline grains. These granules are so frangible that upon any mechanical agitation the clusters fall apart, thus resulting in a fine powder and dust. It is, therefore, impossible to control the size of the resulting grains of anhydrous theophylline. Secondly, certain impurities inherently present in the synthesis or extraction of theophylline are carried along with the crystals during the crystallization of the monohydrated form. Upon further dehydration to produce the anhydrous theophylline, these impurities remain in the final product. Furthermore, under practical conditions of dehydrating the hydrated theophylline at elevated temperatures for prolonged periods of time, it is virtually impossible to remove the last traces of the water of hydration. This results in a product that cakes and agglomerates upon standing.

The primary object of my invention is to overcome the foregoing drawbacks of the dehydration method and to produce a crystalline anhydrous theophylline that is particularly suited for various commercial applications, for example, in pharmaceutical preparations that are formulated into tablets. Another object is to prepare crystalline anhydrous theophylline by a simple and inexpensive method. Another object is to provide a method of crystallizing anhydrous theophylline directly from aqueous solutions thereof. Additional objects and advantages of my invention will become apparent from the following detailed description thereof.

I have discovered that crystalline anhydrous theophylline may be prepared directly from saturated or super-saturated aqueous solutions of theophylline, provided that the temperatures of the solutions are controlled and maintained within certain limits during the crystallization. My investigation of the formation of crystalline anhydrous theophylline from aqueous solutions has shown that it is formed economically above 51.7° C. and below about 105° C. At temperatures appreciably below 51.7° C. the monohydrated form of theophylline is crystallized from the aqueous solution, and at temperatures substantially above 105° C., discoloration and decomposition of the solutions of theophylline are observed. Conditions favorable to the formation of the desired crystalline anhydrous theophylline are produced within the above temperature range by increasing the ratio of theophylline to water, until the solution becomes super-saturated, or by reducing the temperature within said range, thus causing the anhydrous theophylline to crystallize out of the aqueous solution.

The following methods of crystallizing anhydrous theophylline from saturated or super-saturated aqueous solutions thereof may be employed. In each case, the temperatures of the theophylline solution must be maintained within the range of from 51.7° C. to about 105° C. throughout the crystallization.

I. Addition of a solid theophylline to a saturated theophylline solution, while maintaining the temperature substantially constant.

II. Gradual cooling of a solution saturated with theophylline at a temperature near the upper limit of the aforementioned temperature range to slightly above the lower limit of the aforementioned temperature range.

III. Evaporation of a concentrated solution of theophylline to saturation under slightly elevated, atmospheric or reduced pressures.

These methods will be illustrated by specific examples in the following.

It is possible in accordance with my invention to obtain almost any desired crystal size of the anhydrous theophylline by controlling the rate of crystal formation. The individual macrocrystals of the anhydrous theophylline prepared according to my invention are long, thin, translucent prisms, which exhibit parallel extinction. The specific gravity of the crystals is substantially 1.56 at 25° C. Two of their indices of refraction are 1.498 and 1.708. The crystals are readily freed from the mother liquor in which substantially all impurities are retained. They are relatively resistant to abrasion, free from dust, will not powder in handling and shipping, and may be milled to any desired particle size without producing dust. Not only are these crystals, and the crystalline powder prepared therefrom by milling, substantially free from moisture, but they also exhibit little tendency to absorb the moisture from the atmosphere, so that they retain their free-flowing properties and do not tend to cake or agglomerate in storage.

The following examples will serve to illustrate several of the methods whereby the crystalline anhydrous theophylline may be prepared in accordance with my invention. It is, of course, understood that my invention is not limited to the details set forth therein.

Example 1

A saturated aqueous solution of theophylline is prepared in any desired manner at a temperature preferably within the range of from 54.4° C. to 75.5° C., such as, for instance, 65° C. To this saturated aqueous solution there is now slowly added a solid, hydrated theophylline, while applying sufficient heat to maintain the original temperature selected from within the preferred range and momentarily to dissolve the hydrated theophylline added. All of the hydrated theophylline that is added over and above the amount necessary for saturation at the selected temperature will be converted to crystalline anhydrous theophylline, remaining as such in suspension in the solution.

After completing the addition of the hydrated theophylline, the crystalline anhydrous theophylline can be separated from the mother liquor by filtering or centrifuging. It is then washed free from the mother liquor with a small quantity of water or a saturated aqueous theophylline solution, and thereupon dried to eliminate extraneous surface moisture. The translucent, crystalline product thus obtained will assay not less than 99.0% anhydrous theophylline.

Example 2

A saturated aqueous solution of theophylline is prepared at a temperature near the upper limit of the temperature range of from 54.5° C. to 100° C., such as, for instance, 98° C. This solution is then transferred to a crystallization pan or a jacketed vessel containing an agitator (so-called granulator), where it is gradually cooled to a temperature near but not below the lower limit of the aforesaid temperature range, such as, for instance, 55° C. During this cooling, crystallization of anhydrous theophylline takes place. The crystals formed may be separated, washed and dried as described in Example 1, producing a product similar to that of Example 1.

Further crops of crystalline anhydrous theophylline may be obtained from the mother liquor by heating the mother liquor to a temperature of 98° C., adding sufficient solid, hydrated theophylline to produce saturation, and again cooling to the preferred temperature of 55° C., whereby a second crop of anhydrous theophylline is crystallized.

Example 3

An aqueous solution of theophylline is evaporated by boiling it at atmospheric or slightly elevated pressures, until a saturated theophylline solution is obtained. The use of slightly elevated pressures (temperature not to exceed 105° C., however) is sometimes advantageous to inhibit foaming. When evaporation is continued beyond the saturation point of the solution, separation of crystals of anhydrous theophylline begins. The evaporation is continued, until a satisfactory crop of crystals is obtained similar to those of Examples 1 and 2. Separation, washing and drying of the crystals from the mother liquor is preferably effected by the method described in Example 1.

Example 4

An aqueous solution of theophylline is evaporated by boiling it at atmospheric or slightly elevated pressures, until a saturated theophylline solution is obtained. This solution is then transferred to a granulator where it is gradually cooled to a temperature of about 55° C. During this cooling, crystallization of anhydrous theophylline takes place. The crystals formed may be separated, washed and dried as described in Example 1, producing a product similar to that of Example 1. Further crops of crystalline anhydrous theophylline may be obtained from the mother liquor by repeating the evaporation and subsequently cooling.

Example 5

An aqueous solution of theophylline is evaporated to the saturation point under a reduced pressure of such value that the boiling point of the saturated solution lies within the temperature range of from 54.5° C. to 100° C. Thus, for instance, a saturated solution may be obtained, which boils at approximately 70° C. under an absolute pressure of approximately 223 millimeters mercury column. The vacuum is then broken and the solution is heated slightly to raise the temperature and thus prevent sudden crystallization. This solution is transferred to a granulator and cooled as described in Example 2. The crystalline product, similar to that obtained in Example 1, may be separated, washed and dried as described in Example 1. Further crops of crystalline anhydrous theophylline may be obtained from the mother liquor by repeating the vacuum evaporation and subsequently cooling.

Example 6

An aqueous solution of theophylline is evaporated under a reduced pressure of such a value that the boiling point of the solution remains above 54.4° C. For instance, an absolute pressure of approximately 183 millimeters mercury column may be applied, in which case the boiling point of the saturated solution will be approximately 65° C. When the evaporation is continued beyond the saturation point of the solution, separation of crystals of anhydrous theophylline begins. The evaporation is continued until a satisfactory crop of crystals is obtained similar to those of the preceding examples. The separation of the mother liquor is preferably effected by centrifuging.

In the methods of the foregoing examples and in all methods according to my invention, care must be taken that the temperature of the aqueous solution remains above 51.7° C. throughout the crystallization, otherwise the product obtained will become contaminated with monohydrated theophylline. Temperatures above 105° C. must be avoided to prevent discoloration and decomposition. In order to provide a safe margin and to obtain optimum results, I prefer to carry out the crystallization of the anhydrous theophylline within a temperature range of from 54.4° C. to 75.5° C.

The crystalline anhydrous theophylline obtained in accordance with my invention represents a novel product that is quite distinct and surprisingly superior to the previously known dehydrated product. While both may be termed anhydrous theophylline, they differ materially in appearance and physical characteristics. My new process is simpler, quicker and more reliable than the prior art method of dehydrating a hydrated theophylline. Thus, my invention constitutes a definite advance in the art.

As many apparently widely different embodiments of this invention may be made without departing from the spirit and scope hereof, it is to be understood that the invention is not limited to the specific embodiments hereof, except as defined in the appended claims.

I claim:

1. A method for preparing crystalline anhydrous theophylline which comprises super-saturating an aqueous solution of theophylline maintained at a temperature between 51.7° C. and about 105° C., and separating the crystals of anhydrous theophylline thus formed from the mother liquor.

2. A method as claimed in claim 1 wherein the temperature of the aqueous solution is maintained between 54.5° C. and 75.5° C. throughout the crystallization.

3. A method for preparing crystalline anhydrous theophylline, which comprises adding a solid theophylline to a saturated aqueous solution of theophylline maintained at a temperature between 51.7° C. and about 105° C., and then separating the crystals of anhydrous theophylline formed from the mother liquor.

4. A method for preparing crystalline anhydrous theophylline, which comprises forming a saturated aqueous solution of theophylline at a temperature within the upper portion of the range between 51.7° C. and 105° C., cooling said saturated solution to a point within the lower portion of said range, and then separating the crystals of anhydrous theophylline formed from the mother liquor.

5. A method as claimed in claim 4 wherein the temperature of forming the saturated aqueous solution is approximately 100° C., and said solution is cooled to a temperature of about 55° C.

6. A method for preparing crystalline anhydrous theophylline, which comprises evaporating an aqueous solution of theophylline by boiling it at approximately atmospheric pressure, until the point of solution saturation is reached, cooling the solution to a temperature above 51.7° C., and then separating the crystals of anhydrous theophylline formed from the mother liquor.

7. A method as claimed in claim 6 wherein the temperature to which the solution is cooled is about 55° C.

8. A method for preparing crystalline anhydrous theophylline, which comprises evaporating an aqueous solution of theophylline by boiling at approximately atmospheric pressure, until the point of solution saturation is reached, continuing the evaporation, until a satisfactory crop of anhydrous theophylline crystals are formed and then separating the crystals from the mother liquor.

9. A method for preparing crystalline anhydrous theophylline, which comprises evaporating an aqueous solution of theophylline under a reduced pressure such that the boiling point of the solution is maintained within the range of between 51.7° C. and about 100° C., until a saturated solution is obtained, releasing the vacuum and cooling the saturated solution to above 51.7° C. and then separating the crystals of anhydrous theophylline formed from the mother liquor.

10. A method as claimed in claim 9 wherein the temperature to which the saturated solution is cooled is about 55° C.

11. A method for preparing crystalline anhydrous theophylline, which comprises evaporating an aqueous solution of theophylline under a reduced pressure such that the boiling point of the solution is maintained within the range of between 51.7° C. and about 100° C., until the solution saturation point is reached, continuing evaporation, and then separating the crystals of anhydrous theophylline formed from the mother liquor.

12. A method as claimed in claim 11 wherein the temperature range is from about 55° C. to about 65° C.

GEORGE B. STONE.

REFERENCES CITED

The following references are of record in the file of this patent:

UNITED STATES PATENTS

| Number | Name | Date |
| --- | --- | --- |
| 2,041,561 | Mauersberger | May 19, 1936 |